United States Patent [19]

Sugiki

[11] Patent Number: 4,654,838
[45] Date of Patent: Mar. 31, 1987

[54] SIGNAL DETECTING SYSTEM FOR USE IN OPTICAL READING APPARATUS

[75] Inventor: Mikio Sugiki, Yokohama, Japan

[73] Assignee: Sony Corporation, Tokyo, Japan

[21] Appl. No.: 576,391

[22] PCT Filed: May 31, 1983

[86] PCT No.: PCT/JP83/00172
§ 371 Date: Jan. 30, 1984
§ 102(e) Date: Jan. 30, 1984

[87] PCT Pub. No.: WO83/04331
PCT Pub. Date: Dec. 8, 1983

[30] Foreign Application Priority Data

May 31, 1982 [JP] Japan ............................ 57-92383

[51] Int. Cl.$^4$ .................. G11B 21/00; G11B 7/13; G11B 21/10
[52] U.S. Cl. ............................ 369/46; 369/44; 369/120
[58] Field of Search ............... 369/44, 45, 46, 120; 250/201 DF, 201 R

[56] References Cited

U.S. PATENT DOCUMENTS

| | | | |
|---|---|---|---|
| 4,057,833 | 11/1977 | Braat | 369/46 |
| 4,296,316 | 10/1981 | Tsuji et al. | 369/45 |
| 4,445,208 | 4/1984 | Yamamoto et al. | 369/44 |
| 4,458,144 | 7/1984 | Reilly et al. | 369/46 |
| 4,467,462 | 8/1984 | Shibata | 369/46 |
| 4,502,134 | 2/1985 | Kondo et al. | 369/46 |

FOREIGN PATENT DOCUMENTS

| | | | |
|---|---|---|---|
| 0047931 | 4/1981 | Japan | 369/45 |
| 2124802 | 2/1984 | United Kingdom | 369/44 |

Primary Examiner—Raymond F. Cardillo
Assistant Examiner—Hoa T. Nguyen
Attorney, Agent, or Firm—Lewis H. Eslinger; Alvin Sinderbrand

[57] ABSTRACT

An optical head control signal generator comprising a lens (7) disposed in an optical path of a reading light beam caused by an optical head to be incident upon a recording medium and modulated by the recording medium, first, second, third and fourth photosensitive elements ($D_{2a}$, $D_{1a}$, $D_{3a}$, $D_{4a}$) divided as four quarters by perpendicular straight lines and responsive to the reading light beam for producing detected outputs based on an outer peripheral portion of a diffraction pattern formed on an exit pupil surface of the lens (7) by the reading light beam, and a synthesizing circuit (28) for producing a first sum output by adding the detected outputs from the first and third photosensitive elements ($D_{2a}$, $D_{3a}$) and a second sum output by adding the detected outputs from the second and fourth photosensitive elements ($D_{1a}$, $D_{4a}$), and for generating a signal for controlling the optical head, such as a tracking control signal, on the basis of sum and difference signals indicative of the sum of and the difference between the first and second sum signals.

5 Claims, 22 Drawing Figures

| FIG. 3A | FIG. 3B | FIG. 3C |
| PRIOR ART | PRIOR ART | PRIOR ART |

FIG. 7B PRIOR ART $W = \theta \neq 0$
$r = 0$

FIG. 7C PRIOR ART $W = 0$
$r = \frac{T}{2}$

SIGNAL DETECTING SYSTEM FOR USE IN OPTICAL READING APPARATUS

BACKGROUND OF THE INVENTION

1. Field of the Invention

The present invention relates to an optical head control signal generator for generating a signal to control an optical head employed in an optical information reproducing apparatus for optically reproducing information recorded on a recording medium with a beam of light, and more particularly to an optical head control signal generator capable of generating an optical head control signal for causing a light beam to enter into information recording tracks on a recording medium in proper conditions with reduced adverse influences due to a condition of recorded medium regions forming the information recording tracks, a tilt of the recording medium, and other causes.

2. Description of the Prior Art

There is known a reproducing system for playing back a disc-shaped recording medium having information recording tracks in which information signals such as video signals and audio signals are recorded with a series of pits. In the reproducing system, the information recording tracks on the recording medium are scanned by a beam of light such as a laser beam, and variations which the light beam is subjected to are detected to reproduce the recorded information signals. Such a recorded information reproducing system is known as a video disc system, a digital audio disc system and so on. A reproducing apparatus for such a system requires automatic control modes respectively for enabling the light beam to reach the information recording tracks accurately at all times and for focusing the light beam properly on the information recording tracks while scanning the information recording tracks with the light beam. The automatic control modes for causing the light beam to arrive exactly at the information recording tracks and for focusing the light beam properly on the information recording tracks are called tracking control and focusing control, respectively, and are indispensable in the optical information reproducing apparatus of the type described.

Figure 1:
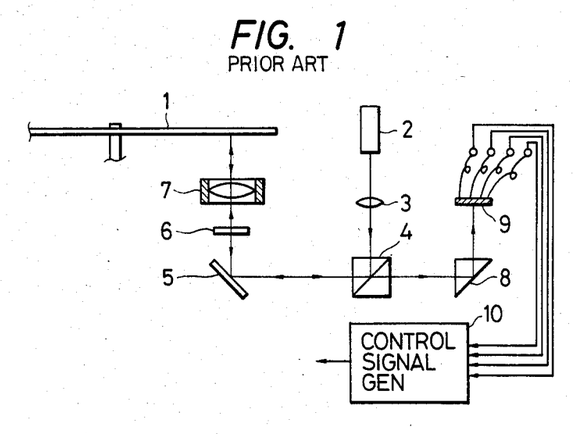
FIG. 1 is a schematic view illustrative of an optical arrangement used in an optical head control signal generator known in the prior art.
Figure 2:
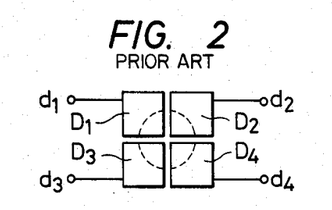
FIG. 2 is a schematic view of a photosensitive unit employed in a conventional optical head control signal generator known in the prior art.

These control modes are normally achieved by causing the light beam to enter through an optical head into the recording medium, receiving the light beam as modulated by the recording medium with the optical head, delivering the received light beam to a photosensitive element, generating control signals indicative of conditions in which the light beam reaches and is focused on the information recording tracks based on a detected output from the photosensitive element, and driving optical means such as a lens, a mirror and so on constituting the optical head with the control signals for positional control. FIG. 1 of the accompanying drawings illustrates, by way of example, an optical arrangement for an optical head control signal generator for supplying control signals to such a control device for an optical head in the optical recorded information reproducing apparatus. A disc-shaped recording medium 1 carries information recording tracks composed of a series of pits. A laser beam emitted from a laser source 2 enters a polarizing prism 4 through a collimator lens 3. The laser beam directed to the left as shown by the polarizing prism 4 reaches an objective lens 7 through a mirror 5 and a quarter wave plate 6. The laser beam is then focused by the objective lens 7 on the recording medium 1. The objective lens 7 is able to be driven for being positionally controlled, for example, in a direction to traverse the information recording tracks and in a direction toward or away from the recording medium. The laser beam falling on the recording medium 1 is modulated by the information recording tracks, reflected back into the objective lens 7, and then travels through the quarter wave plate 6, the mirror 5, the polarizing prism 4, and a prism 8 before reaching a photosensitive unit 9. The reflected light beam, or reading light beam, as modulated by the recording medium and delivered from the objective lens 7 constituting an optical head is detected by photosensitive elements which the photosensitive unit 9 is composed of. Variations in the detected light beam are picked up as a signal by the photosensitive unit 9. The output from the photosensitive unit 9 is then supplied to a control signal generating circuit 10 which generates a control signal to drive, for example, the objective lens 7 constituting the optical head for positional control such as tracking control or focusing control. The photosensitive unit 9 comprises four photosensitive elements $D_1$, $D_2$, $D_3$, $D_4$, for example, as illustrated in FIG. 2. The reading light beam as modulated by the recording medium 1 and guided by the objective lens 7 forms a spot on the photosensitive elements as indicated by the dotted lines in FIG. 2. The photosensitive elements $D_1$ through $D_4$ produce outputs dependent on beam spot portions formed thereon, respectively, the outputs being available at output terminals $d_1$ through $d_4$.

Figure 3A:
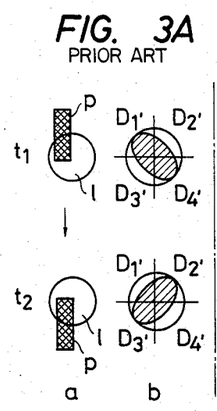
FIGS. 3A to 3C are a set of diagrams used for explaining the positional relationship between a pit forming an information recording track on a recording medium and a spot of incident light as known in the prior art.
Figure 3B:
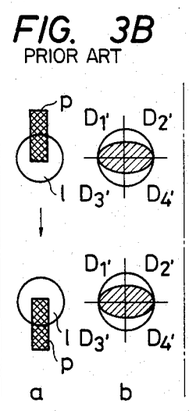
Figure 3C:
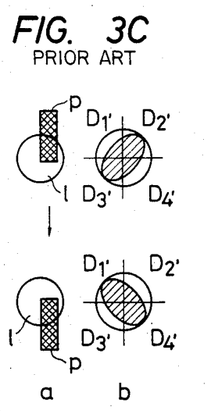

The tracking control will now be considered. The information recording tracks on the recording medium 1 are composed of a series of pits having a depth which is ¼ of the wavelength λ of the incident laser beam. The laser beam irradiating the information recording tracks is diffracted and reflected by the pits. The reading light beam is modulated by the recording medium 1, reflected back through the objective lens 7, and reaches the photosensitive unit 9 to form the spot on the photosensitive elements $D_1$ through $D_4$. The reading light beam then produces a diffraction pattern corresponding to the positional relationship between one of the pits forming the information recording tracks on the recording medium 1 and the laser beam spot irradiating the pit. FIGS. 3A, 3B and 3C illustrate the manner in which the foregoing process takes place. In FIGS. 3A, 3B and 3C, the reference letter a designates the positional relationships between a pit p and a laser beam spot l irradiating the pit p, and the reference letter b designates a diffraction pattern (hatched) formed on the exit pupil surface of the objective lens 7 by the reading light beam dependent on each of the above positional relationships. Four quarters $D_1'$, $D_2'$, $D_3'$ and $D_4'$ shown at b indicate portions in which the quantities of light are detected by the four photosensitive elements $D_1$, $D_2$, $D_3$ and $D_4$, respectively. The pit p moves from the position $t_1$ to the position $t_2$ with respect to the laser beam spot l. FIG. 3A shows the condition in which the laser beam spot l is displaced to the right from the pit p. FIG. 3B illustrates the condition in which the laser beam spot l is positioned centrally on the pit p, that is, the proper tracking condition in which the laser beam arrives properly at the information recording track. FIG. 3C shows the condition in which the laser beam spot l is displaced to the left from the pit p.

It is understood from FIGS. 3A–3C that when the laser beam spot l is centrally positioned on the pit p, that is, when in the proper tracking condition, a diffraction pattern is obtained in which quantities of light are completely symmetrically distributed among the four quarters $D_1'$ through $D_4'$, and when the laser beam spot 1 is positionally displaced rightward or leftward from the pit p, there is produced a diffraction pattern in which no symmetric distribution of the quantities of light is obtained among the four quarters $D_1'$ through $D_4'$, with the light distribution being out of symmetry in reversed patterns when the laser beam spot is displaced to the right and left. Based on the foregoing, outputs from the photosensitive elements $D_1$ through $D_4$ receptive respectively of the quantities of light falling on the four quarters $D_1'$ through $D_4'$ for detecting the quantities of light may be supplied to and processed by a given control signal generator for producing a control signal, that is, a tracking control signal which varies dependent on the positional relationship of the laser beam spot 1 with respect to the pit p. The produced tracking control signal is used to drive the objective lens 7 constituting the optical head for positional control to keep the condition shown in FIG. 3B in which the laser beam spot 1 is positioned centrally on the pit p.

Figure 4:
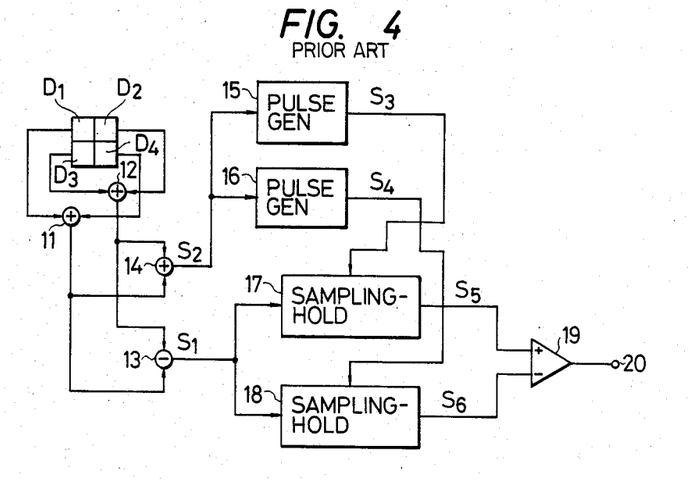
FIG. 4 is a block diagram of a control signal generating circuit including the photosensitive unit in the conventional optical head control signal generator known in the prior art.
Figure 5A:
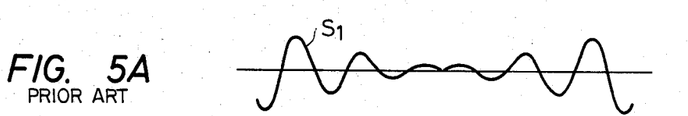
FIGS. 5A to 5F are a set of waveform diagrams used for explaining the operation of the circuit shown in FIG. 4.
Figure 5B:
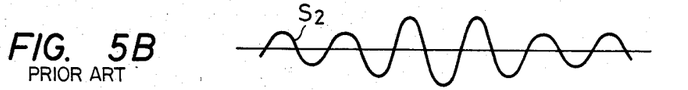
Figure 5C:
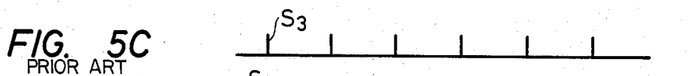
Figure 5D:
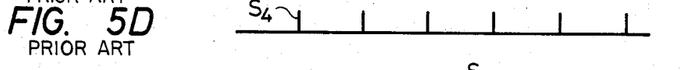
Figure 5E:
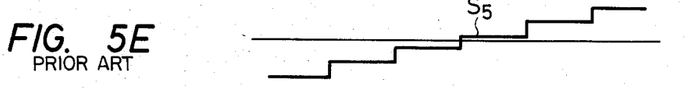
Figure 5F:
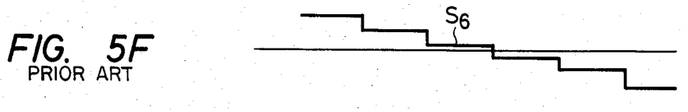

FIG. 4 shows one example of the control signal generating circuit 10 which produces a tracking control signal from the outputs of the photosensitive elements $D_1$ through $D_4$. In the control signal generator, the outputs from the photosensitive elements $D_1$, $D_4$ out of the four photosensitive elements $D_1$ through $D_4$ are added by an adder 11, and the outputs from the photosensitive elements $D_2$, $D_3$ out of the four photosensitive elements $D_1$ through $D_4$ are added by an adder 12. A subtractor 13 produces the difference between outputs from the adders 11, 12 and an adder 14 adds the outputs from the adders 11, 12. When a laser beam spot moves, for example, from right to left across an information recording track composed of a series of pits, the subtractor 13 produces an output signal $S_1$ as shown in FIG. 5A, and the adder 14 produces an output signal $S_2$ as shown in FIG. 5B. The signal $S_1$ comprises a signal having a frequency band of the recorded information signal and varying each time the laser beam spot passes through a pit, the signal serving as a tracking error signal having positional information indicative of which position the laser beam spot is in with respect to the information recording track. The signal $S_2$ serves as a reproduced information signal. The output from the adder 14 is supplied to a pulse generator 15 which produces a pulse output signal $S_3$ in response to rising edges of the signal $S_2$ as shown in FIG. 5C. The output from the adder 14 is also supplied to a pulse generator 16 which produces a pulse output signal $S_4$ in response to falling edges of the signal $S_2$ as shown in FIG. 5D. The subtractor 13 supplies the output to two sampling-hold circuits 17, 18. The sampling-hold circuit 17 issues an output signal $S_5$, as shown in FIG. 5E, which results from sampling and hold performed in response to the pulse signal $S_3$, while the sampling-hold circuit 18 issues an output signal $S_6$, as shown in FIG. 5F, which results from sampling and hold performed in response to the pulse signal $S_4$. The output signals $S_5$, $S_6$ from the sampling-hold circuits have a polarity changing from negative to positive or vice versa when the laser beam spot is moved from right to left across the information recording track, and have a level representative of the deviation of the laser beam spot from the center of the information recording track. Therefore, the output signals $S_5$, $S_6$ can be employed as tracking control signals.

The output signals $S_5$, $S_6$ are supplied to a differential circuit 19 which produces the difference between the supplied signals, the difference serving as a more reliable tracking control signal delivered to an output terminal 20 which is then supplied for example to a driver circuit for driving the objective lens 7.

Figure 6:
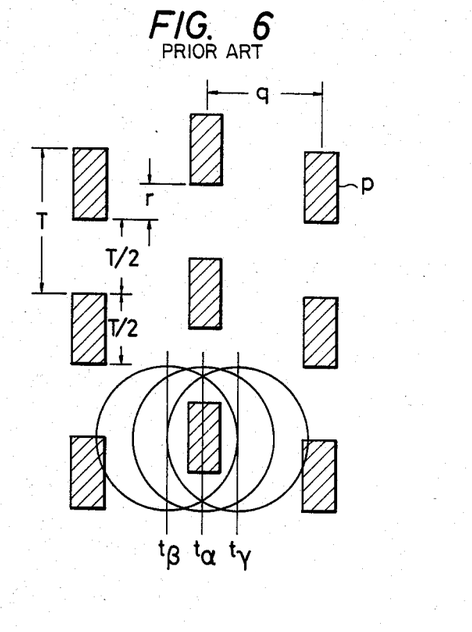
FIGS. 6 and 7A to 7C are illustrations used for explaining the operation of the conventional optical head control signal generator known in the prior art.

The tracking control signal thus produced is affected by a tilt of the surface of the disc-shaped recording medium (hereinafter referred to as a "recording medium tilt") on which information recording tracks are formed with respect to the plane lying perpendicularly to the optical axis of the incident laser beam, and also by a positional relationship between pits forming one information recording track and pits forming an adjacent information recording track (hereinafter referred to as a "pit arrangement") on the disc-shaped recording medium in the direction along the information recording tracks. The tracking control signal is caused to vary depending on the recording medium tilt and the pit arrangement. For example, as shown in FIG. 6, a disc-shaped recording medium has information recording tracks composed of rectangular pits p recorded at a constant recording signal wavelength T and each having a length of T/2, the pits p being spaced at an interval of T/2. The information recording tracks are spaced at a track pitch q with the pit arrangement having a phase difference of r. When a laser beam emitted from the optical system shown in FIG. 1 falls on the disc-shaped recording medium thus constructed and the control signal generating circuit shown in FIG. 4 produces a tracking control signal, a tracking error signal, that is, the signal $S_1$ issued from the subtractor 13 shown in FIG. 4 is obtained as illustrated in FIGS. 7A, 7B and 7C.

Figure 7A:
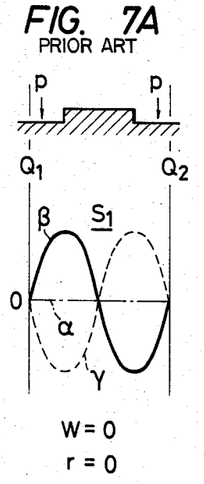
Figure 7B:
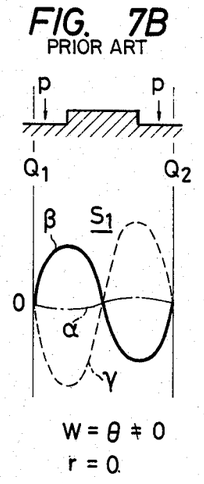
Figure 7C:
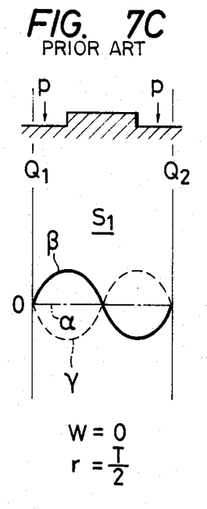

FIGS. 7A, 7B and 7C illustrate a tracking error signal $S_1$ produced when the center of the laser beam spot relatively moves from the center $Q_1$ of one of the pits p forming one information recording track to the center $Q_2$ of one of the pits p forming a next information recording track on the disc-shaped recording medium. In the proper tracking condition in which the center of the laser beam spot moves along a track center line $t_\alpha$ as shown in FIG. 6, the tracking error signal $S_1$ is of a waveform as shown by a dot-and-dash line $\alpha$. When the center of the laser beam spot is displaced to the left from the track center line $t_\alpha$ and moves along a line $t_{62}$ as shown in FIG. 6, resulting in a tracing error, the tracking error signal $S_1$ has a waveform as shown by a solid line $\beta$. When the center of the laser beam spot is displaced to the right from the track center line $t_\alpha$ and moves along a line $t_\gamma$ spaced as equally from the track center line $t_\alpha$ as the line $t_\beta$, resulting in a tracking error, the tracking error $S_1$ has a waveform as shown by a broken line $\gamma$. In FIG. 7A, a recording medium tilt W is zero and the phase difference r of the pit arrangement is zero. In FIG. 7B, the recording medium tilt W is not zero but $\theta$ (for example, one degree) and the phase difference r of the pit arrangement is zero. In FIG. 7C, the recording medium tilt W is zero and the phase difference r of the pit arrangement is T/2. As is understood from the above, when the recording medium tilt W and the phase difference r are both zero, the signal pattern $\alpha$ is zero with the signal patterns $\beta$ and $\gamma$ being of an equal amplitude and opposite phases. When the recording medium tilt W is not zero but $\theta$, the signal pattern $\alpha$ is not zero with the signal pattern $\beta$ being of a smaller amplitude than when W and r are zero and the signal pattern $\gamma$ being of a larger amplitude than when W and r are zero, resulting in an unbalanced condition. When the phase difference r is not zero but T/2, the signal pattern α is zero and the signal patterns β and γ are of an equal amplitude and opposite phases but are smaller in amplitide than when W and r are zero.

As described above, the tracking error signal $S_1$ is affected by the recording medium tilt and the pit arrangement to thereby produce amplitude variations. Any tracking control signal generated on the basis of such tracking error signal contains an error and fails to perform proper tracking control.

SUMMARY OF THE INVENTION

With the foregoing difficulties in view, it is an object of the present invention to provide an optical head control signal generator which can produce an optical head control signal subjected to greatly reduced adverse influences due to a recording medium tilt and a pit arrangement as described above on the basis of a reading light beam caused by an optical head to be incident upon a recording medium and modulated thereby.

Figure 8A:
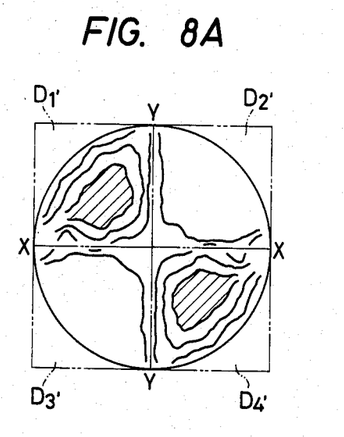
FIGS. 8A to 8D are a set of diagrams showing varying diffraction patterns on the surface of an objective lens in the optical system illustrated in FIG. 1.
Figure 8B:
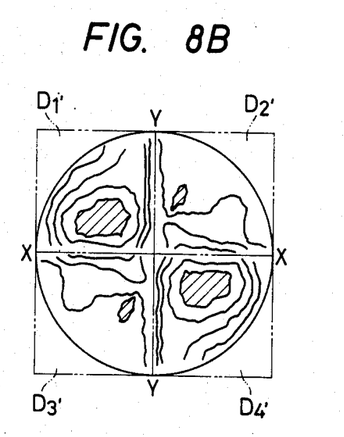
Figure 8C:
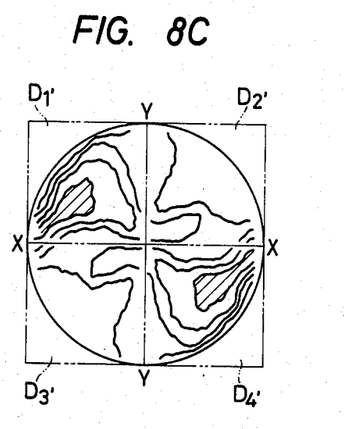
Figure 8D:
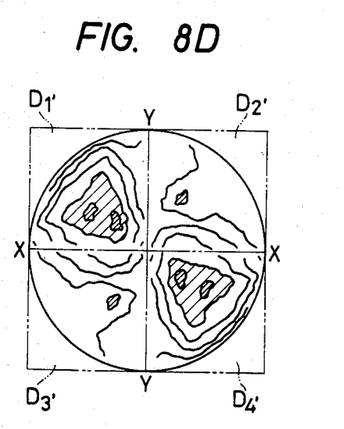

When a laser beam emitted from the optical system shown in FIG. 1 falls on a disc-shaped recording medium having information recording tracks composed of a series of pits p as shown in FIG. 6, a laser beam as modulated by the disc-shaped recording medium is received as a reading light beam by the optical arrangement of FIG. 1. A diffraction pattern produced by the reading light beam on the exit pupil surface of the objective lens 7 will now be studied in detail. When the center of the laser beam on the disc-shaped recording medium is spaced $\frac{1}{4}$T from the center of one pit p in a direction along the information recording track and also spaced $\frac{1}{4}$q from the center of the same pit in a direction across the information recording track, thus producing a tracking error by $\frac{1}{4}$q, the diffraction patterns are generated as schametically shown in FIGS. 8A–8D. The diffraction patterns (enclosed in circles) shown in FIGS. 8A through 8D have hatched peak portions with surrounding lines serving as diagrams indicating equal levels. Four quarters $D_1'$ through $D_4'$ indicated by the two-dot-and-dash lines in FIGS. 8A through 8D correspond respectively to four photosensitive elements constituting a photosensitive unit, e.g., portions in which quantities of incident light are detected by the photosensitive elements $D_1$ through $D_4$. FIG. 8A shows a diffraction pattern produced when the recording medium tilt W is zero and the phase difference r of the pit arrangement is also zero. The diffraction pattern of FIG. 8B is produced when W is not zero but θ (for example, one degree) and r is zero. FIG. 8C illustrates a diffraction pattern produced when W is zero and r is not zero but T/2. FIG. 8D shows a diffraction pattern produced when W is not zero but θ (for example, one degree) and r is not zero but T/2.

It can be seen from the foregoing that when there is a recording medium tilt, the diffraction pattern on the exit pupil surface of the objective lens 7 is varied under the influence of coma aberration produced by the recording medium tilt, and when there is a phase difference of the pit arrangement, the diffraction pattern is also varied under the influence of the phase difference. Since the four quarters $D_1'$ through $D_4'$ shown in FIGS. 8A through 8D correspond respectively to the portions in which the quantities of light are detected by the four photosensitive elements $D_1$ through $D_4$, respectively, the difference between the light distribution on the diagonal portions $D_1'$, $D_4'$ and the light distribution on the diagonal portions $D_2'$, $D_3'$ contributes to the amplitude of the tracking error signal $S_1$ produced as the output from the subtractor 13. A light distribution component that is symmetrical with respect to a line X—X and a light distribution component that is symmetrical with respect to a line Y—Y serve to reduce the amplitude of the tracking error signal $S_1$.

Now attention is directed to central portions of the diffraction patterns shown in FIGS. 8A through 8D. Except for the diffraction pattern of FIG. 8A, the diffraction patterns shown in FIGS. 8B through 8D are distinctly generated which tend to increase a light distribution component symmetrical with respect to the line X—X or the line Y—Y. Accordingly, the light distribution component in each of the diffraction patterns of FIGS. 8B through 8D which reduces the amplitude of the tracking error signal $S_1$ is highly increased as compared with that in the diffraction pattern of FIG. 8A. Attention is also drawn to the outer peripheries of the diffraction patterns of FIGS. 8A through 8D. The difference between the quantities of light on the diagonal portions $D_1'$, $D_4'$ is equal to the difference between the quantities of light on the diagonal portions $D_2'$, $D_3'$, and a light distribution component which is symmetrical with respect to the line X—X or the line Y—Y is small. Therefore, light distribution components which vary the amplitude of the tracking error signal $S_1$ therebetween are small in the respective diffraction patterns of FIGS. 8A through 8D.

As a consequence, any influence due to a recording medium tilt and a pit arrangement can be reduced by detecting the quantity of light only in the outer peripheral portion of the diffraction pattern on the exit pupil surface of the objective lens 7 as shown in FIGS. 8A through 8D to thereby generate a tracking error signal.

Based on the foregoing results of the study, an optical head control signal generator according to the present invention has an optical arrangement similar to that shown in FIG. 1 with the photosensitive unit arranged for detecting the quantity of light only in the outer peripheral portion of a diffraction pattern formed on the exit pupil surface of the objective lens by a reading light beam. A tracking error signal is generated in response to an output signal from the photosensitive unit based on the detected quantity of light only in the outer peripheral portion of the diffraction pattern, and an optical head control signal is produced from the tracking error thus generated.

An optical head control signal generator according to the present invention comprises a lens disposed in an optical path of a reading light beam caused by an optical head to be incident upon a recording medium and modulated by the recording medium, four photosensitive elements disposed respectively in first, second, third and fourth quadrants divided by two perpendicular straight lines and responsive to the reading light beam for producing detected outputs based on an outer peripheral portion of a diffraction pattern formed on an exit pupil surface of the lens by the reading light beam, and a synthesizing circuit for producing a first sum output by adding the detected outputs from two located in the first and third quadrants out of the four photosensitive elements and a second sum output by adding the detected outputs from two located in the second and fourth quadrants out of the four photosensitive elements, and for generating a signal to control the optical head on the basis of sum and difference signals indicative of the sum of and the difference between the first and second sum signals.

With the optical head control signal generator thus constructed according to the present invention, an accurate tracking control signal can be produced on the basis of a tracking error signal which is subjected to greatly reduced adverse influences due to a recording medium tilt, a bit arrangement and so on.

DETAILED DESCRIPTION OF PREFERRED EMBODIMENTS

Figure 9:
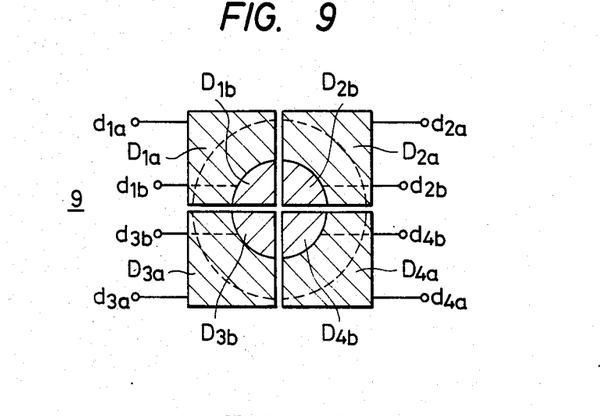
FIG. 9 is a schematic view of a photosensitive unit employed in an optical head control signal generator according to the present invention.

An optical head control signal generator according to the present invention has such an optical arrangement as illustrated in FIG. 1, except for a photosensitive unit. As shown in FIG. 9, a photosensitive unit 9' has four photosensitive elements $D_{1a}$, $D_{2a}$, $D_{3a}$ and $D_{4a}$ for detecting quantities of light in an outer peripheral portion of a diffraction pattern on the exit pupil surface of the objective lens 7, and four photosensitive elements $D_{1b}$, $D_{2b}$, $D_{3b}$ and $D_{4b}$ for detecting quantities of light in a central portion of a diffraction pattern on the exit pupil surface of the objective lens 7. The photosensitive elements $D_{1a}$ and $D_{1b}$, $D_{2a}$ and $D_{2b}$, $D_{3a}$ and $D_{3b}$, and $D_{4a}$ and $D_{4b}$ correspond respectively to the photosensitive elements $D_1$, $D_2$, $D_3$ and $D_4$ shown in FIG. 2. Output terminals $d_{1a}$, $d_{2a}$, $d_{3a}$ and $d_{4a}$ are led from the photosensitive elements $D_{1a}$, $D_{2a}$, $D_{3a}$ and $D_{4a}$, respectively, and output terminals $d_{1b}$, $d_{2b}$, $d_{3b}$ and $d_{4b}$ are led from the photosensitive elements $D_{1b}$, $D_{2b}$, $D_{3b}$ and $D_{4b}$, respectively.

Figure 10:
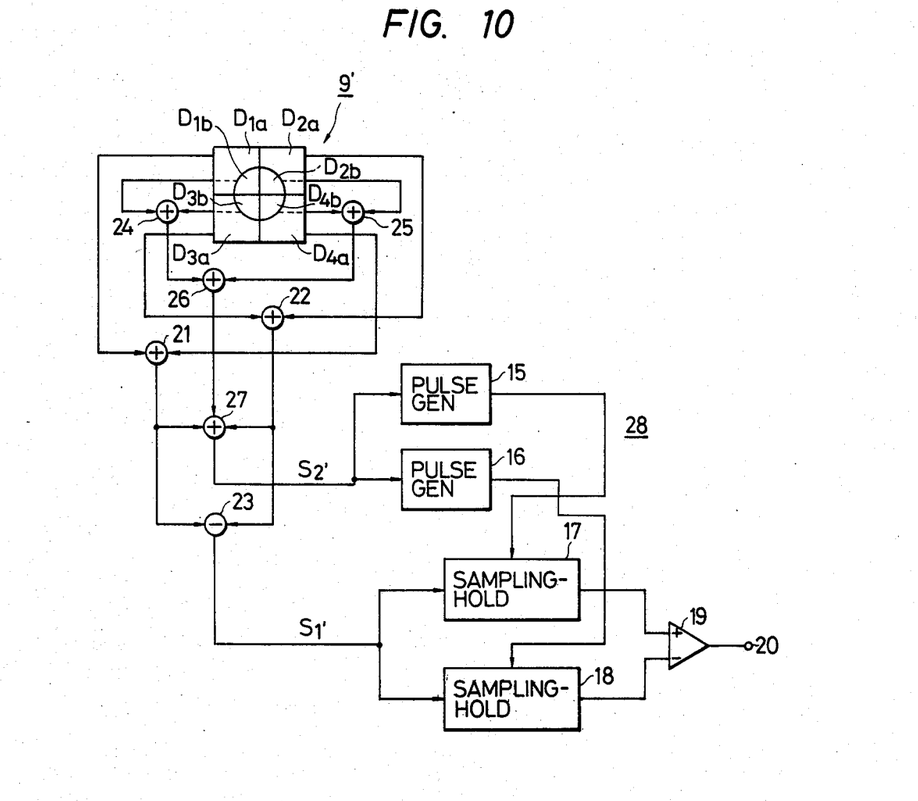
FIG. 10 is a block diagram of a control signal generating circuit including the photosensitive unit in the optical head control signal generator according to the present invention.

FIG. 10 shows a control signal generating circuit including the photosensitive unit 9' composed of the eight photosensitive elements $D_{1a}$–$D_{4a}$ and $D_{1b}$–$D_{4b}$ in the optical head control signal generator of the present invention. Outputs from the photosensitive elements $D_{1a}$, $D_{4a}$ are added by an adder 21, and outputs from the photosensitive elements $d_{2a}$, $D_{3a}$ are added by an adder 22. A subtractor 23 produces the difference between outputs from the adders 21, 22. Outputs from the photosensitive elements $D_{1b}$, $D_{2b}$, $D_{3b}$ and $D_{4b}$ are added by adders 24, 25 and 26, and outputs from the adders 21, 22 and 26 are added by an adder 27. The subtractor 23 produces a tracking error signal $S_1'$ indicative of the difference between the sum of the outputs from the photosensitive elements $D_{1a}$, $D_{4a}$ and the sum of the outputs from the photosensitive elements $D_{2a}$, $D_{3a}$. The adder 27 produces the total sum of the outputs from the eight photosensitive elements $D_{1a}$–$D_{4a}$ and $D_{1b}$–$D_{4b}$. An output from the subtractor 23 is supplied to sampling-hold circuits 17, 18 identical to those shown in FIG. 1. An output from the adder 27 is supplied to pulse generators 15, 16 identical to those shown in FIG. 1. Outputs from the sampling-hold circuits 17, 18 are supplied to a differential circuit 19 identical to that shown in FIG. 1. A tracking control signal is then produced in the same operation as that of the circit of FIG. 1 and available through an output terminal 20. Therefore, the pulse generator 15, the pulse generator 16, the sampling-hold circuits 17, 18, and the differential circuit 19 jointly constitute a synthesizing circuit 28 for generating a tracking control signal based on the output from the subtractor 23 and the output from the adder 27.

The tracking error signal $S_1'$ from the subtractor 23 is produced on the basis of the outputs from the photosensitive elements $D_{1a}$, $D_{2a}$, $D_{3a}$ and $D_{4a}$, that is, outputs indicative of the quantities of light only in the outer peripheral portion of the diffraction pattern formed on the exit pupil surface of the objective lens 7 by the reading light beam. As a consequence, any influence on the tracking error signal due to a recording medium tilt and a bit arrangement is greatly reduced, and the tracking error signal suffers from no amplitude variation. Based on the tracking error signal $S_1'$ with reduced adverse influence due to the recording medium tilt and the pit arrangement, a correct tracking control signal can be obtained at the output terminal 20. In the above embodiment, all outputs from the eight photosensitive elements $D_{1a}$–$D_{4a}$ and $D_{1b}$–$D_{4b}$ are added to produce a reproduced information signal. Thus, the reading light beam can be utilized highly effectively for generating a reproduced information signal efficiently.

The detection of the quantities of light only in the outer peripheral portion of a diffraction pattern produced on the exit pupil surface of the objective lens by the reading light beam in the optical head control signal generator may be effected by other means than the foregoing arrangement in which the photosensitive unit is divided into a photosensitive element area for detecting the quantities of light in the outer peripheral portion of the diffraction pattern and a photosensitive element area for detecting the quantities of light in the central portion of the diffraction pattern.

The optical head control signal generator according to the present invention is capable of generating a highly stable and accurate tracking control signal, and is therefore suitable for use in optical digital audio disc players (compact disc players), video disc players, optical disc memory players and so on.

What is claimed is:

1. An optical head control signal generator comprising a lens (7) disposed in a reading light beam path caused by an optical head to be incident upon a recording medium and to be modulated by the recording medium, a photosensitive unit formed of four photosensitive elements ($D_{2a}$, $D_{1a}$, $D_{3a}$, $D_{4a}$) disposed respectively in first, second, third and fourth quadrants divided by two perpendicular straight lines, each of said elements being rectangular in shape and having a cut-out portion formed at a respective corner thereof adjacent the intersection of said two perpendicular straight lines, whereby said photosensitive unit has a central cut-out portion that produces no output, and said photosensitive unit is responsive to only the outer peripheral portion of a diffraction pattern from the modulated reading light beam incident thereon for producing detected outputs based on said outer peripheral portion surrounding said central cut-out portion of said diffraction pattern formed on an exit pupil surface of said lens (7) by the reading light beam, and a synthesizing circuit (28) for producing a first sum output by adding the detected outputs from two photosensitive elements ($D_{2a}$, $D_{3a}$) located in said first and third quadrants out of said four photosensitive elements ($D_{2a}$, $D_{1a}$, $D_{3a}$, $D_{4a}$) and a second sum output by adding the detected outputs from two photosensitive elements ($D_{1a}$, $D_{4a}$) located in said second and fourth quadrants out of said four photosensitive elements ($D_{2a}$, $D_{1a}$, $D_{3a}$, $D_{4a}$), and for generating a signal for controlling said optical head on the basis of sum and difference signals indicative of the sum of and the difference between said first and second sum signals.

2. Apparatus for generating a control signal for an optical head of the kind having a lens element disposed in a light beam path, in which the light beam is modulated by a record element, the apparatus comprising:

first, second, third, and fourth photosensitive elements arranged in respective quadrants defined by two perpendicular straight lines, each of said four photosensitive elements being in the form of a rectangle with one corner being arcuately cut out, defining a closed rectangular area with an open circular center area, and each for producing an output representing a respective peripheral portion of said closed rectangular area of a diffraction pattern formed on an exit pupil surface of the lens by the light beam, said outputs from said first, second, third, and fourth photosensitive elements being fed to a synthesizing circuit including means for producing a first summed signal from two diagonal ones of said four photosensitive elements and a second summed signal from the remaining two diagonal ones of said photosensitive elements, and including means for producing a sum signal and a difference signal from said first and second summed signals and means for generating the control signal therefrom.

3. Apparatus according to claim 2, further comprising fifth, sixth, seventh, and eighth photosensitive elements arranged in respective quadrants and each being in the form of a quarter circle having respective corners thereof arranged at the intersection of said two perpendicular straight lines and being arranged within said open center formed by said first, second, third, and fourth photosensitive elements, said fifth, sixth, seventh, and eighth photosensitive elements each producing an output fed to said synthesizing circuit.

4. Apparatus according to claim 3, in which said synthesizing circuit further comprises means for summing said outputs from said fifth, sixth, seventh, and eighth photosensitive elements and producing a third summed signal therefrom, and means for summing said first, second, and third summed signal to produce said sum signal used to generate said control signal.

5. Apparatus according to claim 4, in which said synthesizing circuit further comprises pulse generating means generating sampling pulses in response to said sum signal.

* * * * *